United States Patent
Sakiyama et al.

(10) Patent No.: US 10,791,247 B2
(45) Date of Patent: Sep. 29, 2020

(54) DATA PROCESSING APPARATUS WITH URL RISK ASSESSMENT, DATA OUTPUT METHOD AND NON-TRANSITORY COMPUTER-READABLE RECORDING MEDIUM ENCODED WITH DATA OUTPUT PROGRAM

(71) Applicant: KONICA MINOLTA, INC., Chiyoda-ku, Tokyo (JP)

(72) Inventors: Daisuke Sakiyama, Kawanishi (JP); Akihiro Torigoshi, Itami (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 16/502,109

(22) Filed: Jul. 3, 2019

(65) Prior Publication Data

US 2020/0076986 A1    Mar. 5, 2020

(30) Foreign Application Priority Data

Aug. 31, 2018    (JP) .................................. 2018-163963

(51) Int. Cl.
  *H04N 1/44*       (2006.01)
  *H04N 1/00*       (2006.01)
  *G06F 21/57*      (2013.01)

(52) U.S. Cl.
  CPC .......... *H04N 1/4453* (2013.01); *G06F 21/57* (2013.01); *H04N 1/00005* (2013.01); *H04N 1/00018* (2013.01); *H04N 1/00037* (2013.01); *G06F 2221/031* (2013.01)

(58) Field of Classification Search
  None
  See application file for complete search history.

(56) References Cited

U.S. PATENT DOCUMENTS

| 2006/0206571 | A1* | 9/2006 | Kuwahara | H04L 63/1441 709/206 |
| 2009/0070872 | A1* | 3/2009 | Cowings | H04L 51/12 726/23 |
| 2016/0125135 | A1* | 5/2016 | Ramanathan | G06F 16/9554 705/3 |

FOREIGN PATENT DOCUMENTS

| JP | 2006252483 A | 9/2006 |
| JP | 2011107739 A | 6/2011 |
| JP | 2014013983 A | 1/2014 |
| JP | 2016118948 A | 6/2016 |

* cited by examiner

*Primary Examiner* — Andrew H Lam
(74) *Attorney, Agent, or Firm* — Buchanan Ingersoll & Rooney PC

(57) ABSTRACT

A data processing apparatus includes a hardware processor, wherein the hardware processor acquires data that is input externally as input data, detects link information that is included in the input data and represents a position of another data on a network, in the case where the link information is detected, determines a risk level of the other data represented by the link information, in the case where the risk level of the other data is determined to be equal to or higher than a predetermined risk level, produces correction data by processing a portion representing the link information in the input data, and outputs the correction data externally instead of the input data.

19 Claims, 15 Drawing Sheets

F I G. 3
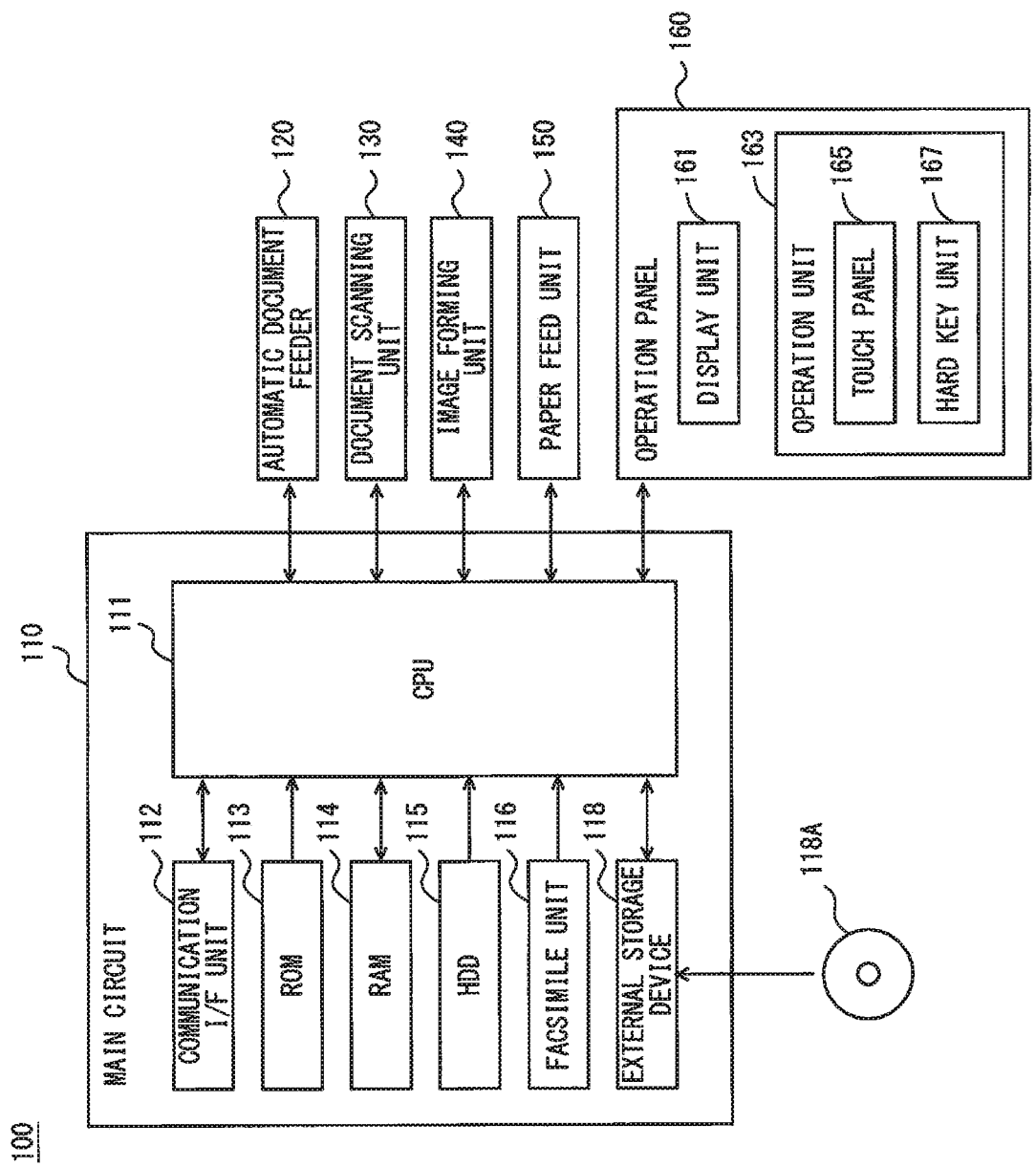

DATA PROCESSING APPARATUS WITH URL RISK ASSESSMENT, DATA OUTPUT METHOD AND NON-TRANSITORY COMPUTER-READABLE RECORDING MEDIUM ENCODED WITH DATA OUTPUT PROGRAM

The entire disclosure of Japanese patent Application No. 2018-163963 filed on 31 Aug. 2018 is incorporated herein by reference in its entirety.

BACKGROUND

Technological Field

The present invention relates to a data processing apparatus, a data output method and a non-transitory computer-readable recording medium encoded with a data output program. The present invention relates to a data processing apparatus that processes data including link information, a data output method performed in the data processing apparatus and a non-transitory computer-readable recording medium encoded with a data output program for allowing a computer to perform the data output method.

Description of the Related Art

Contents on the Internet are acquired with use of the URL of the contents. A web filtering service has been known in order to ensure the safety in acquisition of the contents on the Internet. For example, Japanese Patent Laid-Open No. 2016-118948 describes a social web filtering service system having a filter function that determines whether a warning screen showing a view warning is to be displayed on a web browser in a client's terminal when receiving an access to a website from the client's terminal of a web filter add-in. Further, Japanese Patent Laid-Open No. 2016-252483 describes a URL risk level determination system that determines the risk level of a URL included in an email received by a client device.

A data processing apparatus such as an MFP (Multi Function Peripheral) receives the data that is input externally, and outputs the input data externally. In the case where receiving data, the MFP may receive the data from an external computer using a communication function of the MFP, or the MFP may scan an image formed on a document using a scan function of the MFP. In the case where outputting data externally, the MFP may transmit the data to an external computer using the communication function of the MFP, or the MFP may form an image of the data on a recording medium such as a paper using an image forming function of the MFP.

Therefore, in the case where the data that is input in the MFP externally includes a high risk URL, the MFP may output the data including the URL externally. Therefore, even in the case where it is determined that the risk level of the URL included in the data that is input in the MFP is high, there is a problem that the URL may be utilized after the data including the URL is output externally by the MFP.

SUMMARY

According to one aspect of the present invention, a data processing apparatus includes a hardware processor, the hardware processor acquiring data that is input externally as input data, detecting link information that is included in the input data and represents a position of another data on a network, in the case where the link information is detected, determining a risk level of the other data represented by the link information, in the case where the risk level of the other data is determined to be equal to or higher than a predetermined risk level, producing correction data by processing a portion representing the link information in the input data, and outputting the correction data externally instead of the input data.

According to another aspect of the present invention, a data output method performed by a data processing apparatus includes an acquiring step of acquiring data that is input externally as input data, a link information detecting step of detecting link information included in the input data, the link information indicating a position of another data on a network, a risk level determining step of, in the case where the link information is detected, determining a risk level of the other data represented by the link information, a data producing step of, in the case where the risk level of the other data is determined to be equal to or higher than a predetermined risk level, producing correction data by processing a portion representing the link information in the input data, and an output step of outputting the correction data externally instead of the input data.

According to yet another aspect of the present invention, a non-transitory computer-readable recording medium encoded with a data output program is executed by a computer controlling a data processing apparatus, wherein the data output program allows the computer to execute an acquiring step of acquiring data that is input externally as input data, a link information detecting step of detecting link information included in the input data, the link information indicating a position of another data on a network, a risk level determining step of, in the case where the link information is detected, determining a risk level of the other data represented by the link information, a data producing step of, in the case where the risk level of the other data is determined to be equal to or higher than a predetermined risk level, producing correction data by processing a portion representing the link information in the input data, and an output step of outputting the correction data externally instead of the input data.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 3 is a block diagram showing an outline of a hardware configuration of the MFP in the present embodiment;

DETAILED DESCRIPTION OF EMBODIMENTS

Figure 1:
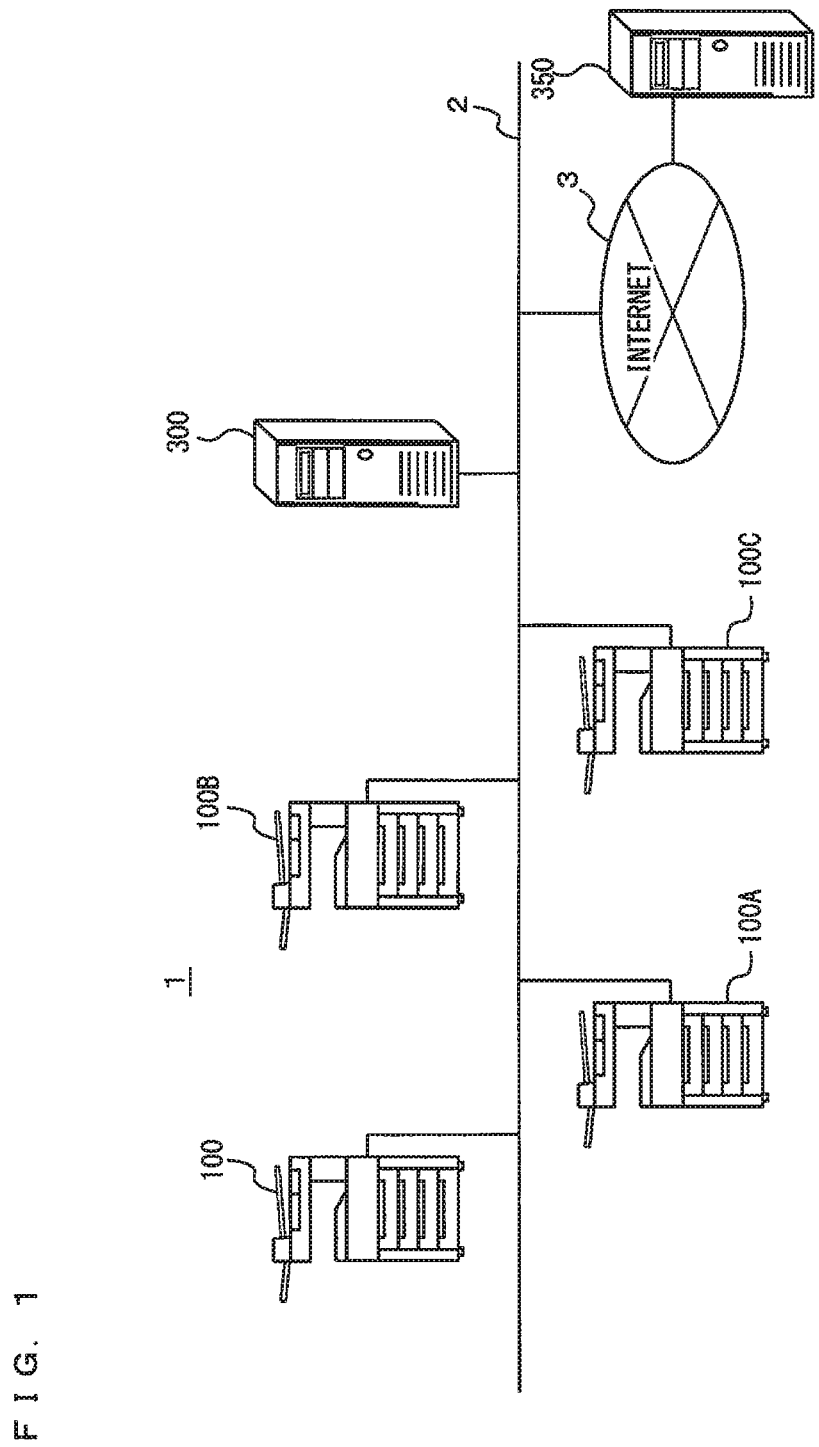
FIG. 1 is a diagram showing an overview of a data processing system in one embodiment of the present invention.

Hereinafter, one or more embodiments of the present invention will be described with reference to the drawings. However, the scope of the invention is not limited to the disclosed embodiments.

Embodiments of the present invention will be described below with reference to the drawings. In the following description, the same parts are denoted with the same reference characters. Their names and functions are also the same. Thus, a detailed description thereof will not be repeated.

FIG. 1 is a diagram showing the overview of a data processing system in one embodiment of the present invention. Referring to FIG. 1, the data processing system 1 includes MFPs (Multi Function Peripherals) 100, 100A, 100B, 100C and a server 300 that are respectively connected to a network 2. The MFPs 100, 100A, 100B, 100C are one example of a data processing apparatus, and include a plurality of functions such as a scan function, a print function, a copy function, a facsimile transmission reception function and a communication function.

A network 2 is a Local Area Network (LAN), either wired or wireless. Further, the network 2 is not limited to a LAN and may be a Wide Area Network (WAN), a Public Switched Telephone Network (PSTN) or the like. The network 2 is connected to the Internet 3 via a gateway, and the MFPs 100, 100A, 100B, 100C can respectively communicate with a web server 350 connected to the Internet 3.

The server 300 is a general computer. The server 300 produces a URL list including high risk URLs (Uniform Resource Locator) and stores the URL list. The technology used by the server 300 for producing the URL list has been conventionally known. Therefore, a description thereof will not be repeated. The URL list stored by the server 300 defines a risk level for each URL. The higher the risk level is, the higher the risk is. The higher the probability of distributing computer viruses is, the higher the risk level is set. Further, the server 300 may use an access authorization as a predetermined reference when defining the risk level. For example, an age-restricted website is high risk. The URL list stored in the server 300 does not have to define risk levels, and may only include risky URLs. While the server 300 stores the URL list in this case, the web server 350 may store the URL list.

While the MFPs 100, 100A, 100B, 100C are explained as one example of the data processing apparatus in the present embodiment, the present invention is not limited to this. As long as including the function of inputting and outputting data, the data processing apparatus may be a personal computer, a scanner, a printer or a facsimile machine, for example. Each of the MFPs 100, 100A, 100B, 100C has the same functions. The MFP 100 will be described here, by way of example.

Figure 2:
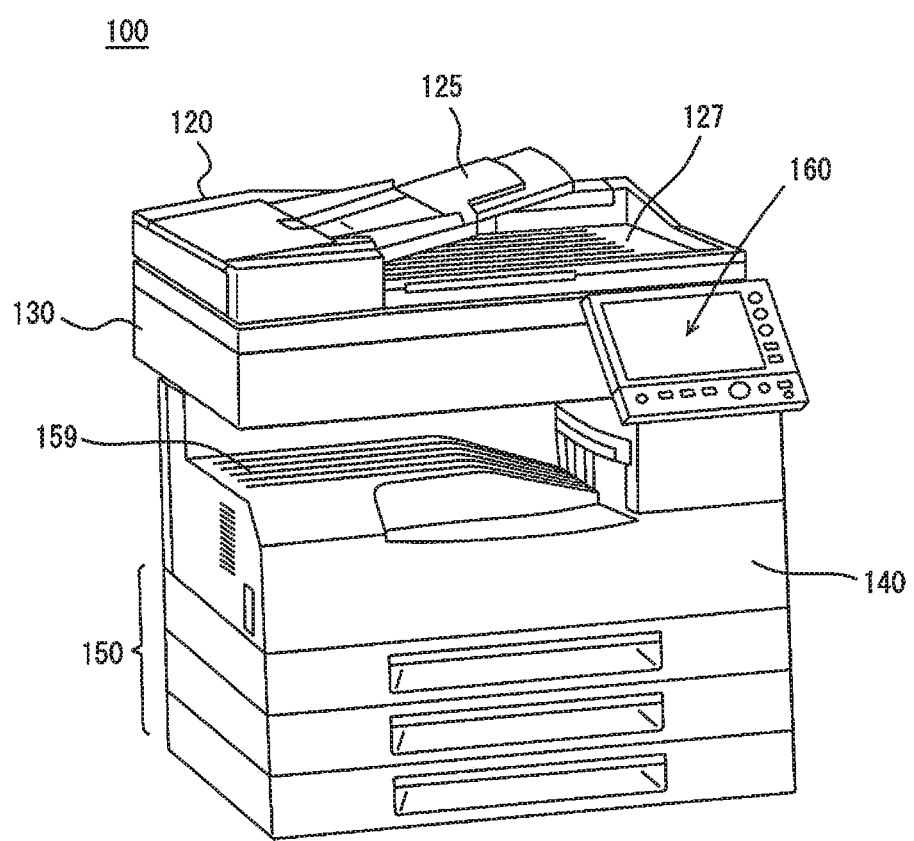
FIG. 2 is a perspective view showing the appearance of an MFP in the present embodiment.

FIG. 2 is a perspective view showing the appearance of the MFP in the present embodiment. FIG. 3 is a block diagram showing an outline of a hardware configuration of the MFP in the present embodiment. Referring to FIGS. 2 and 3, the MFP 100 includes a main circuit 110, a document scanning unit 130 for scanning a document, an automatic document feeder 120 for conveying a document to the document scanning unit 130, an image forming unit 140 for forming an image on a paper (a sheet of paper) based on image data, a paper feed unit 150 for feeding a paper to the image forming unit 140 and an operation panel 160 serving as a user interface.

The automatic document feeder 120 automatically conveys a plurality of documents set on a document tray 125 to a document scan position of the document scanning unit 130 one by one, and discharges the document including an image that is scanned by the document scanning unit 130 onto a document discharge tray 127.

The document scanning unit 130 includes an exposure lamp and a CCD (Charge Coupled Devices) sensor that photoelectrically converts the received light into an electric signal. The exposure lamp exposes the document set at the scan position. The light emitted from the exposure lamp is reflected by the document. The light reflected from the document forms an image on the CCD sensor. The CCD sensor converts the reflected light that has formed an image on a light receiving surface into document data as an electric signal and outputs the document data to the CPU 111. In the CCD sensor, an optoelectronic transducer is arranged in a main scan direction. The document scanning unit 130 moves the position of the document irradiated with the light emitted by the exposure lamp in a sub-scan direction perpendicular to the main scan direction, thereby outputting two-dimensional document data. The positions of the document and the exposure lamp relative to each other are changed in the sub-scan direction, whereby the position of the document irradiated with light emitted by the exposure lamp is moved.

The image forming unit 140 is controlled by the CPU 111 and forms an image on the paper conveyed by the paper feed unit 150 using a well-known electrophotographic method. In the present embodiment, the image forming unit 140 forms an image of the image data received from the CPU 111 on the paper conveyed by the paper feed unit 150 according to an image forming condition. The paper on which an image is formed is discharged to a paper discharge tray 159. The image data output by the CPU 111 to the image forming unit 140 includes image data representing an image of the received print data that is input externally in addition to the image data received from the document scanning unit 130.

The main circuit 110 includes a CPU (Central Processing Unit) 111 that controls the MFP 100 as a whole, a communication interface (I/F) unit 112, a ROM (Read Only Memory) 113, a RAM (Random Access Memory) 114, a hard disc drive (HDD) 115 serving as a mass storage device, a facsimile unit 116 and an external storage device 118. The CPU 111 is connected to the automatic document feeder 120, the document scanning unit 130, the image forming unit 140, the paper feed unit 150 and the operation panel 160, and controls the MFP 100 as a whole.

The ROM 113 stores a program executed by the CPU 111 and the data required for execution of the program. The RAM 114 is used as a work area when the CPU 111 executes the program. Further, the RAM 114 temporarily stores the image data that is successively sent from the document scanning unit 130.

The operation panel 160 is provided in an upper portion of the MFP 100. The operation panel 160 includes a display unit 161 and an operation unit 163. The display unit 161 is a Liquid Crystal Display (LCD) device, for example, and displays instruction menus to users, information about the acquired image data, and the like. As long as displaying an image, an organic EL (electroluminescense) display, for example, can be used instead of the LCD.

The operation unit 163 includes a touch panel 165 and a hard key unit 167. The touch panel 165 is a capacitance type. The touch panel 165 can use not only the capacitance type but also another type such as a resistive film type, a surface acoustic wave type, an infrared type or an electromagnetic induction type.

The detection surface of the touch panel 165 is provided with its detection surface being superimposed on an upper surface or a lower surface of the display unit 161. The size of the detection surface of the touch panel 165 and the size of the display surface of the display unit 161 are the same. Therefore, the coordinate system of the display surface and the coordinate system of the detection surface are the same. The touch panel 165 detects the position, designated by a user on the display surface of the display unit 161, on the detection surface, and outputs the coordinates of the detected position to the CPU 111. Because the coordinate system of the display surface and the coordinate system of the detection surface are the same, the coordinates output by the touch panel 165 can be replaced with the coordinates of the display surface.

The hard key unit 167 includes a plurality of hard keys. The hard keys are contact switches, for example. The touch panel 165 detects a position designated by the user in a display surface of the display unit 161. In the case where operating the MFP 100, the user is likely to be in an upright attitude, so that the display surface of the display unit 161, an operation surface of the touch panel 165 and the hard key unit 167 are arranged to be directed upward. The user can easily view the display surface of the display unit 161 and easily give an instruction on the operation unit 163 with his or her finger.

The communication I/F unit 112 is an interface for connecting the MFP 100 to the network 2. The communication I/F unit 112 communicates with another computer connected to the network 2 using a communication protocol such as a TCP (Transmission Control Protocol) or an FTP (File Transfer Protocol).

The facsimile unit 116 is connected to the public switched telephone networks (PSTN) and transmits facsimile data to or receives facsimile data from the PSTN. The facsimile unit 116 stores the received facsimile data in the HDD 115, converts the facsimile data into print data that is printable in the image forming unit 140, and outputs the data to the image forming unit 140. The image forming unit 140 forms an image of the facsimile data received by the facsimile unit 116 on a paper. Further, the facsimile unit 116 converts the data stored in the HDD 115 into facsimile data, and transmits the facsimile data to a facsimile machine connected to the PSTN.

The external storage device 118 is controlled by the CPU 111 and mounted with a CD-ROM (Compact Disk Read Only Memory) 118A or a semiconductor memory. While the CPU 111 executes a program stored in the ROM 113 in the present example by way of example, the CPU 111 may control the external storage device 118, read the program to be executed by the CPU 111 from the CD-ROM 118A, store the read program in the RAM 114 and execute the program.

It is noted that the recording medium for storing the program executed by the CPU 111 is not limited to the CD-ROM 118A. It may be a flexible disc, a cassette tape, an optical disc (MO (Magnetic Optical Disc)/MD (Mini Disc)/DVD (Digital Versatile Disc)), an IC card, an optical card, and a semiconductor memory such as a mask ROM and an EPROM (Erasable Programmable ROM). Further, the CPU 111 may download a program from the computer connected to the network 2 and store the program in the HDD 115. Alternatively, the computer connected to the network 2 may write the program in the HDD 115, load the program stored in the HDD 115 into the RAM 114 and execute the program in the CPU 111. The program referred to here includes not only a program directly executable by the CPU 111 but also a source program, a compressed program, an encrypted program or the like.

Figure 4:
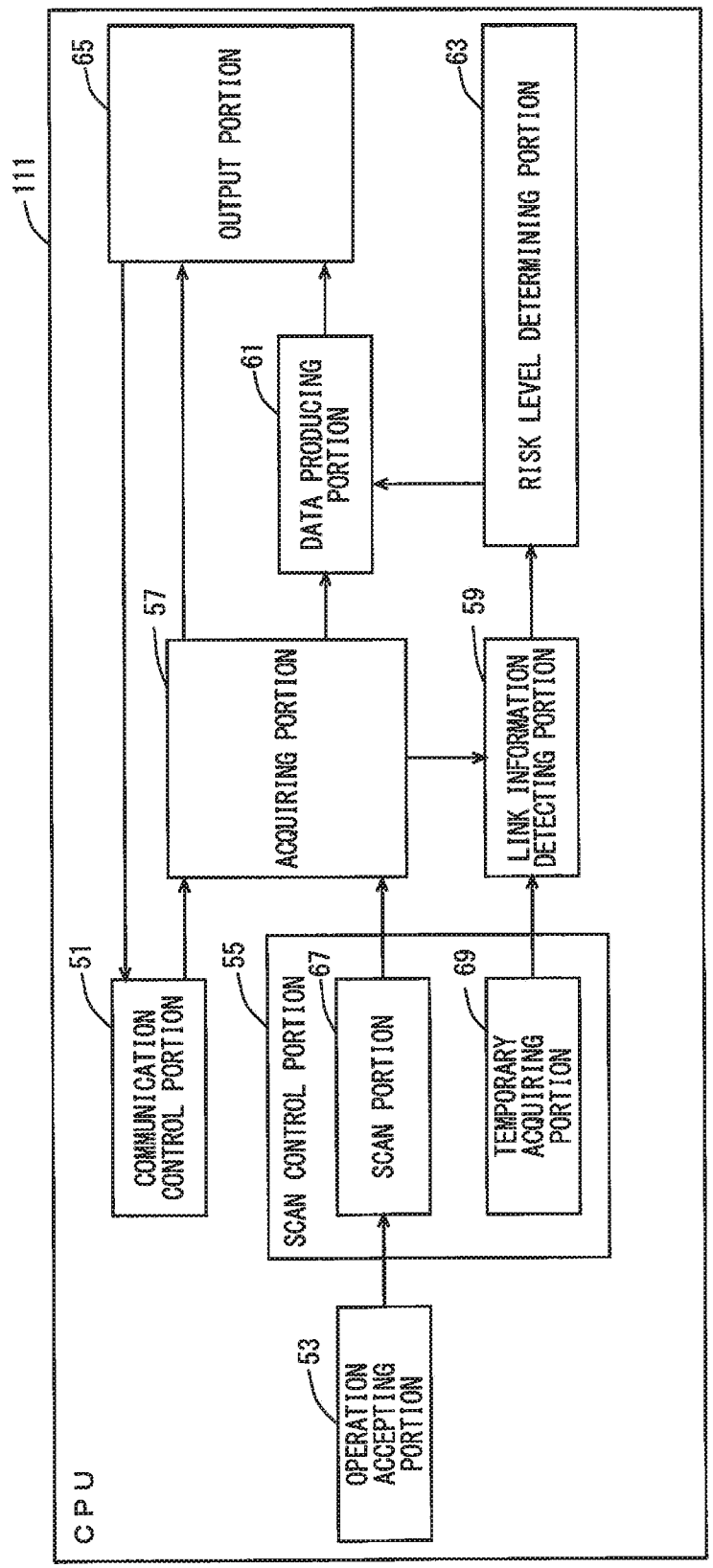
FIG. 4 is a function block diagram showing one example of functions of a CPU included in the MFP in the present embodiment.

FIG. 4 is a function block diagram showing one example of the functions of the CPU included in the MFP in the present embodiment. The functions shown in FIG. 4 are functions realized in the CPU 111 when the CPU 111 included in the MFP 100 executes a data output program. Referring to FIG. 4, the CPU 111 includes a communication control portion 51, an operation accepting portion 53, a scan control portion 55, an acquiring portion 57, a link information detecting portion 59, a data producing portion 61, a risk level determining portion 63 and an output portion 65.

The operation accepting portion 53 accepts an operation input by the user. The operation accepting portion 53 controls the operation unit 163 and accepts a user's operation of inputting in the operation unit 163. Further, in the case where the MFP 100 is remotely operated by a portable information device carried by the user, the operation accepting portion 53 communicates with the portable information device via the communication I/F unit 112. In the case where the communication I/F unit 112 receives a remote operation that is input by the user in the portable information device, the operation accepting portion 53 accepts the remote operation as the operation input by the user who operates the portable information device. In the case where accepting the operation input by the user, the operation accepting portion 53 outputs the operation identification information for identifying the operation to the scan control portion 55.

The scan control portion 55 controls the document scanning unit 130 and allows the document scanning unit 130 to optically scan an image formed on a document, and acquires document data that is output by the document scanning unit 130. The scan control portion 55 accepts an operation of setting scan conditions and an operation of instructing a start of the scan from the operation accepting portion 53. The scan condition includes a resolution condition and a color condition. The resolution condition is indicated by the number of pixels per inch, for example. The color condition is indicated by the number of colors. In response to reception of an operation of setting the scan condition, the scan control portion 55 sets the input scan condition as a first scan condition, and determines the scan condition having image quality that is lower than that of the first scan condition as a second scan condition. Specifically, as for the resolution condition, which is one of the scan condition, the second scan condition has a value lower than that of the first scan condition. Further, as for the color condition, which is one of the scan condition, the second scan condition has a value smaller than that of the first scan condition. Specifically, in the case where the first scan condition indicates colored, the second scan condition indicates monochrome.

The scan control portion 55 includes a scan portion 67 and a temporary acquiring portion 69. In response to acceptance of an operation of instructing a start of the scan, the temporary acquiring portion 69 allows the document scanning unit 130 to scan the document according to the second scan condition and acquires the document data that is output by the document scanning unit 130 as temporary image data. The temporary acquiring portion 69 outputs the temporary image data to the link information detecting portion 59. Immediately after the document scanning unit 130 scans the document according to the second scan condition, the scan portion 67 allows the document scanning unit 130 to scan the document according to the first scan condition, and acquires the document data that is output by the document scanning unit 130 as input data. The scan portion 67 outputs the input data to the acquiring portion 57.

In response to reception of input data from the scan portion 67, the acquiring portion 57 outputs the input data to the data producing portion 61 and the output portion 65.

The link information detecting portion 59 detects link information from the input data. In this case, the link information detecting portion 59 detects the link information from the temporary image data. The temporary image data received from the temporary acquiring portion 69 and the input data output by the scan portion 67 are both document data output by the document scanning unit 130 that has scanned the same document. The temporary image data is the document data output by the document scanning unit 130 that has scanned the document according to the second scan condition. The input data is the document data output by the document scanning unit 130 that has scanned the document according to the first scan condition. Therefore, the temporary image data represents the same image as the input data. Further, the resolution of the temporary image data is lower than that of the input data, and the number of colors of the temporary image data is smaller than that of the input data. Thus, the data amount of the temporary image data is smaller than that of the input data. Therefore, the time length required for the link information detecting portion 59 to process the temporary image data is shorter than the time length required for the link information detecting portion 59 to process the input data.

The link information detecting portion 59 extracts the link information from the temporary image data. The link information is the information indicating the position of the contents on the network. The contents is the data stored in a computer connected to the network 2 or the Internet and different from the input data. The link information is a URL. The URL is constituted by a scheme name, a host name and a file name. The scheme name is a character string that is predetermined as the information indicating a protocol. The scheme name is "http", "news" or "nntp", for example.

Figure 5:
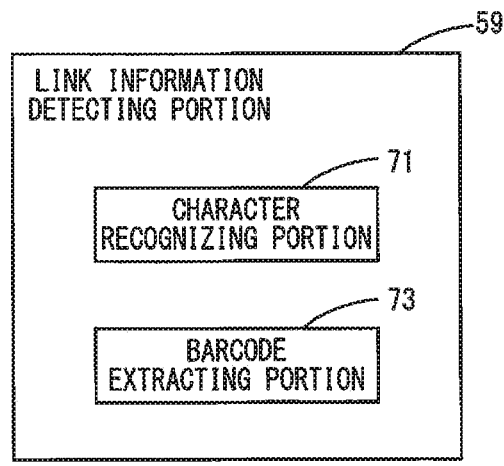
FIG. 5 is a block diagram showing one example of the detailed functions of a link information detecting portion.

FIG. 5 is a block diagram showing one example of detailed functions of the link information detecting portion. Referring to FIG. 5, the link information detecting portion 59 includes a character recognizing portion 71 and a barcode extracting portion 73. The character recognizing portion 71 recognizes characters in the temporary image data and converts the image represented by the temporary image data into character information. The link information detecting portion 59 extracts a group of character strings starting with the character string defined as a scheme name of the URL as the link information. When extracting the link information from the character information into which the temporary image data has been converted, the link information detecting portion 59 outputs a set of the link information and the region information indicating the region representing the link information in the image represented by the temporary image data to the risk level determining portion 63.

The link information can be represented by a two-dimensional barcode. The two-dimensional barcode includes a predetermined position detection pattern. Therefore, the barcode extracting portion 73 detects the position detection pattern from the temporary image data. In the case where detecting the position detection pattern from the temporary image data, the barcode extracting portion 73 extracts the portion defined by the position detection pattern in the temporary image data as the region representing the two-dimensional barcode. The barcode extracting portion 73 analyzes the region representing the two-dimensional barcode and converts the two-dimensional code into character information.

In the case where the character information into which the two-dimensional barcode has been converted includes a group of character information starting with a character string that is defined as a scheme name of a URL, the link information detecting portion 59 determines the group of character information as the link information. The group of character information includes a scheme name, a host name and a file name. The link information detecting portion 59 outputs a set of the link information and the region information indicating the region representing the two-dimensional barcode in the image represented by the temporary image data to the risk level determining portion 63.

Returning to FIG. 4, the risk level determining portion 63 receives a set of the link information and the region information from the link information detecting portion 59. The risk level determining portion 63 downloads a URL list from the server 300. In the case where the link information received from the link information detecting portion 59 is the same as any of the URLs included in the URL list, the risk level determining portion 63 determines the risk level associated with the URL that is the same as the link information as the risk level of the link information. If the risk level of the link information is equal to or higher than a predetermined threshold value, the risk level determining portion 63 determines that the link information is a risky URL. In the case where the URL that is the same as the link information is not included in the URL list, or the case where the risk level of the link information is lower than the threshold value, the risk level determining portion 63 determines that the link information is a safe URL. In the case where determining the link information as a risky URL, the risk level determining portion 63 outputs a set of the link information and the region information to the data producing portion 61. In the case where receiving a plurality of sets of link information and region information from the link information detecting portion 59, the risk level determining portion 63 determines the risk level of the link information for each of the plurality of sets.

The data producing portion 61 receives the input data from the acquiring portion 57. In the case where receiving a set of the link information and the region information from the risk level determining portion 63, the data producing portion 61 produces correction data by processing the input data and outputs the correction data to the output portion 65. In the case where not receiving a set of the link information and the region information from the risk level determining portion 63, the data producing portion 61 does not produce correction data. Therefore, the data producing portion 61 outputs the signal indicating that correction data has not been produced to the output portion 65. Detailed functions of the data producing portion 61 will be described below.

The output portion 65 receives the input data from the acquiring portion 57. In the case where receiving the correction data from the data producing portion 61, the output portion 65 outputs the correction data instead of the input data as the output data. In the case where receiving the signal indicating that the correction data has not been produced from the data producing portion 61, the output portion 65 outputs the input data as the output data. The destination to which the output data is output by the output portion 65 is defined by the operation accepted by the operation accepting portion 53. In the case where the operation accepted by the operation accepting portion 53 is an operation of instructing the formation of an image, the output portion 65 outputs the output data to the image forming unit 140 and allows the image forming unit 140 to form an image of the output data. In the case where the operation accepted by the operation accepting portion 53 is an operation of instructing the storage of the output data in the HDD 115, the output portion 65 stores the output data in the HDD 115. In the case where the operation is the operation of instructing the transmission of the output data to an external computer, the output portion 65 outputs the output data to the communication control portion 51, and requests the communication control portion 51 to transmit the output data. The destination to which the output data is transmitted and the method of transmitting the output data are defined by a user's operation of inputting in the operation unit 163.

The communication control portion 51 transmits data to an external computer. The data, which the communication control portion 51 transmits to the external computer includes the data that is stored in the HDD 115 and transmitted to the computer connected to the network 2, for example. Further, in the case where an email transmission reception program is installed in the MFP 100, the communication control portion 51 transmits an email to an email server. In the case where being requested by the output portion 65 to transmit the output data, the communication control portion 51 controls the communication I/F unit 112 and transmits the output data to the transmission destination according to the transmission method based on the transmission method and the transmission destination that are specified by the user's operation of inputting in the operation unit 163.

The communication control portion 51 in the MFP 100 controls the communication I/F unit 112, receives the data that is input externally and transmits the data externally. For example, the communication control portion 51 receives the data transmitted by the computer connected to the network 2. The data, which the communication I/F unit 112 receives from the computer includes the application data that is produced by a task of executing an application program in the computer and the print data that is produced by a task of executing a driver program for controlling the MFP 100. Further, in the case where the email transmission reception program is installed in the MFP 100, the communication control portion 51 receives an email from the email server. The communication control portion 51 outputs the received data that has been input externally to the acquiring portion 57.

Here, the communication I/F unit 112 receives data that is input externally, by way of example. In the case where receiving the data that has been input externally from the communication control portion 51, the acquiring portion 57 outputs the data that is received from the communication control portion 51 as input data to the link information detecting portion 59 and the data producing portion 61.

In the case where receiving input data from the acquiring portion 57, the link information detecting portion 59 extracts the link information from the input data. In the case where the input data is the image data representing an image, the link information detecting portion 59 extracts the link information from the input data similarly to the temporary image data. After the input data is converted into the temporary image data having lower resolution and a smaller number of colors, the link information detecting portion 59 may extract the link information from the temporary image data. Thus, the processing speed can be increased. In the case where the input data is not image data, the input data may include character information. In this case, the link information detecting portion 59 extracts the link information from the input data. In the case where extracting the link information, the link information detecting portion 59 outputs a set of the link information and the region information to the risk level determining portion 63. Further, in the case where the barcode extracting portion 73 extracts a two-dimensional barcode from the input data, the link information detecting portion 59 outputs a set of the link information and the region information that are represented by the two-dimensional barcode to the risk level determining portion 63.

The risk level determining portion 63 determines the risk level of the link information received from the link information detecting portion 59 based on the URL list, and determines whether the link information is a risky URL. In the case where determining the link information as a risky URL, the risk level determining portion 63 outputs a set of the link information and the region information to the data producing portion 61.

Figure 6:
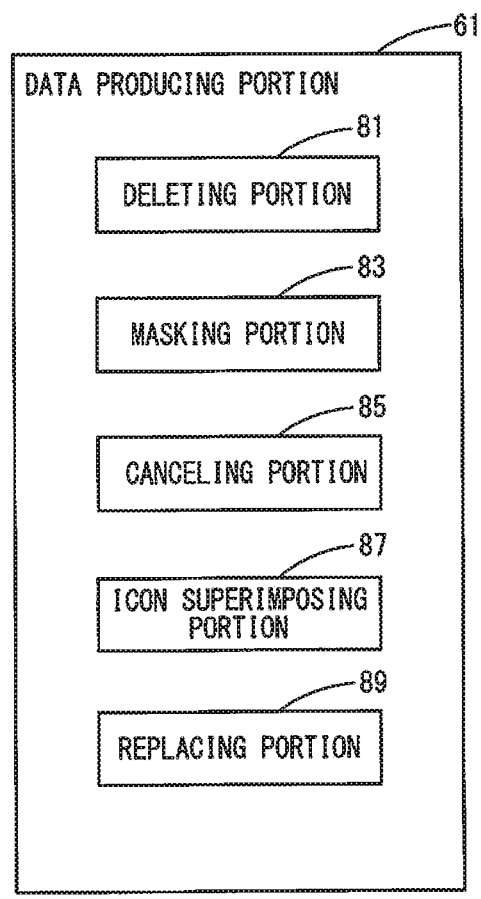
FIG. 6 is a block diagram showing one example of the detailed functions of a data producing portion.

FIG. 6 is a block diagram showing one example of the detailed functions of the data producing portion. Referring to FIG. 6, the data producing portion 61 includes a deleting portion 81, a masking portion 83, a canceling portion 85, an icon superimposing portion 87 and a replacing portion 89. In the case where the input data is the data that represents an image, the data producing portion 61 produces correction data by deleting a link portion or overwriting the link portion with a correction image, the link portion including the link information in the image represented by the input data. In the case where the input data is not the data that represents an image, the data producing portion 61 produces correction data by replacing the link information included in the input data with alternative data. In the case where the input data is the data that represents an image, the data producing portion 61 activates one or more of the deleting portion 81, the masking portion 83, the canceling portion 85 and the icon superimposing portion 87. In the case where the input data is not the data that represents an image, the data producing portion 61 activates the replacing portion 89.

The deleting portion 81 processes the link portion specified by the region information in the image of the input data. The deleting portion 81 deletes the link portion. For example, the deleting portion 81 sets a pixel value of the link portion to the same value as the value of the pixel around the link portion.

The masking portion 83 processes the link portion specified by the region information in the image of the input data. The masking portion 83 overwrites the link portion with a first correction image having the same shape and size as the link portion. The first correction image has a constant pixel value and is a solid image. In the case where the first correction image has a highest density, the link portion is masked with the first correction image.

The canceling portion 85 processes the link portion in the image of the input data. The canceling portion 85 overwrites the link portion with a second correction image. The second correction image includes strikethroughs. Thus, the strikethroughs are superimposed on the image including the link portion, which represents the link information.

The icon superimposing portion 87 processes the link portion in the image of the input data. The icon superimposing portion 87 overwrites the link portion with a third correction image. The third correction image includes an icon, which is a predetermined image. Therefore, the icon is superimposed on the image including the link information represented by the link portion. The icon is preferably an image that catches user's attention.

The data producing portion 61 may activate a set including one of the deleting portion 81 and the masking portion 83, and one of the canceling portion 85 and the icon superimposing portion 87. For example, when the first correction image is in a predetermined color and has a low density, the second correction image or the third correction image is superimposed on the link portion hatched with the first correction image. Further, when the first correction image is in the same color as the link information included in the image of the link portion, the link information represented by the link portion is deleted. Further, because the correction data represents an image in which the second correction image or the third correction image is superimposed on the link portion from which the link information has been deleted, the second correction image or the third correction image included in the link portion of the correction data indicates that the link information had been included.

In the case where the input data is not image data, the replacing portion 89 produces the correction data by replacing the link information included in the input data with alternative data. The alternative data is the data representing whitespace characters. Further, the alternative data may be the data that is obtained by addition of strikethroughs to the link information, or may include predetermined character information.

Figure 7:
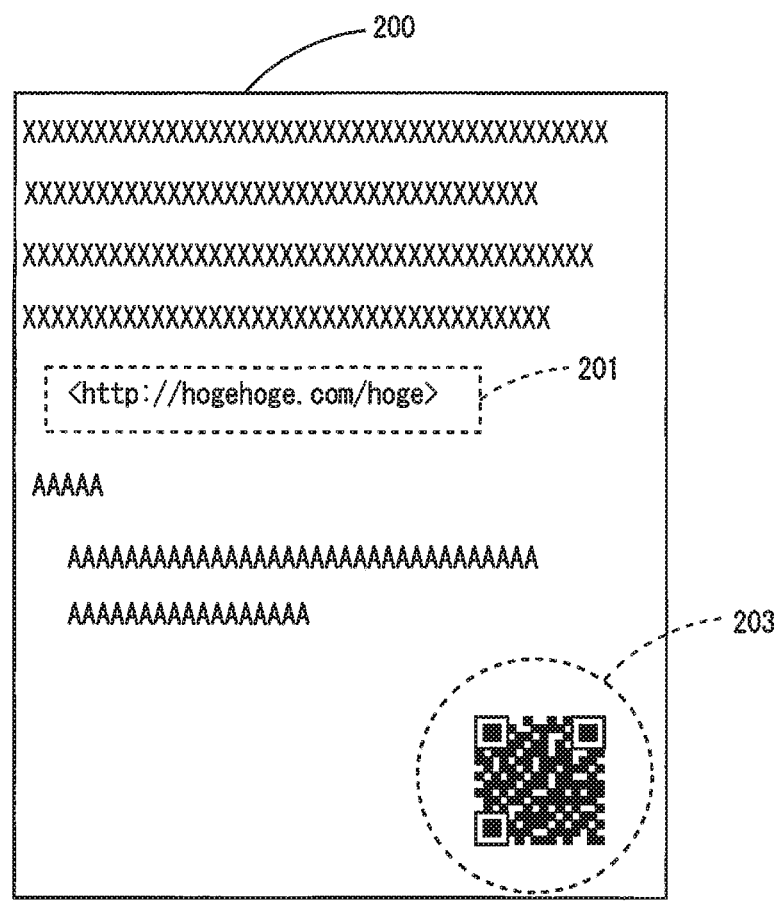
FIG. 7 is a diagram showing one example of an image represented by input data.

FIG. 7 is a diagram showing one example of an image of the input data. The image 200 of the input data includes a link portion 201 representing a URL and a link portion 203 representing a two-dimensional barcode as the link information.

Figure 8:
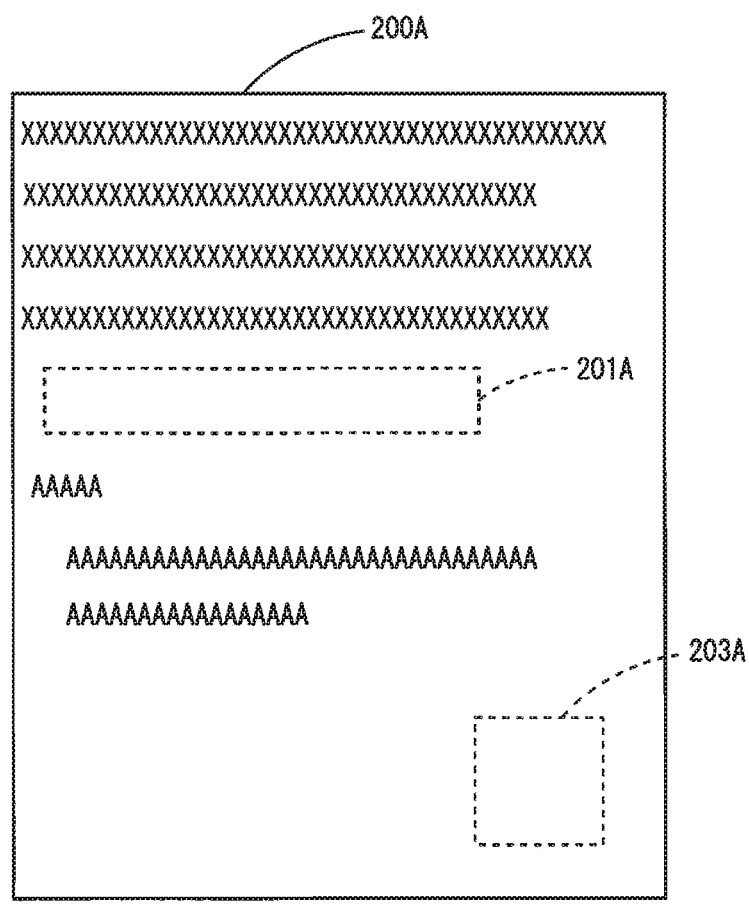
FIG. 8 is a first diagram showing one example of an image represented by correction data.

FIG. 8 is a first diagram showing one example of an image of the correction data. The dotted lines in the diagram are used for the purposes of description, and do not actually exist. The image 200A of the correction data shown in FIG. 8 is produced when the link portions in the image 200 of the input data shown in FIG. 7 are deleted. Referring to FIG. 8, the image 200A of the correction data is an image that is obtained by deletion of the link portions 201, 203 in the image 200 of the input data shown in FIG. 7. The pixel values of the link portions 201A, 203A respectively corresponding to the link portions 201, 203 are the same as that of the background of the image 200 of the input data.

Figure 9:
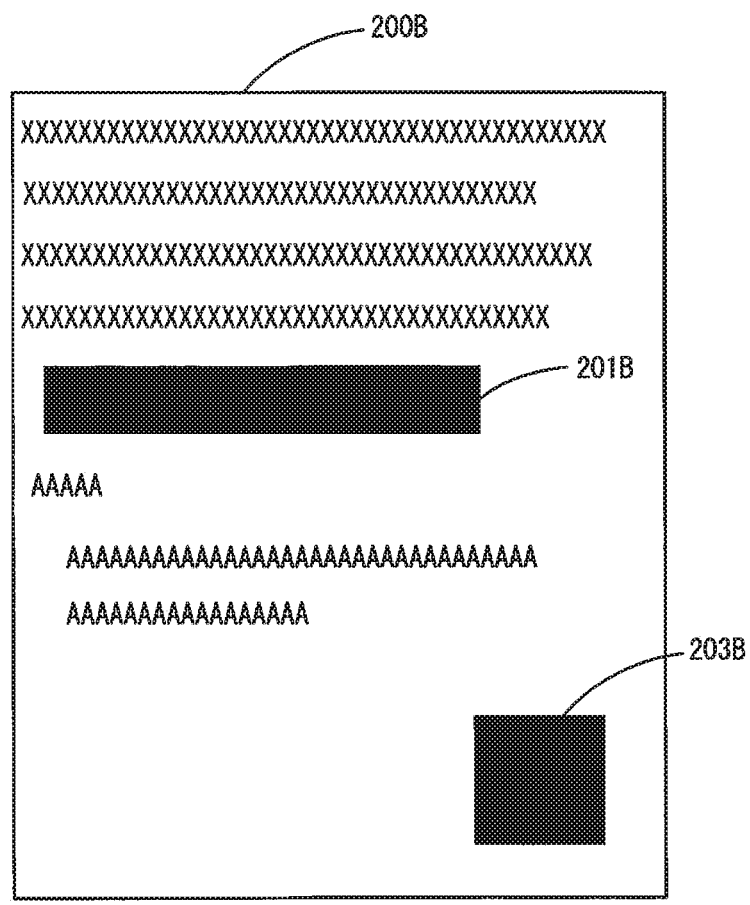
FIG. 9 is a second diagram showing one example of an image represented by correction data.

FIG. 9 is a second diagram showing one example of an image of the correction data. An image 200B of the correction data shown in FIG. 9 is produced when the link portion in the image 200 of the input data shown in FIG. 7 is overwritten with the first correction image. Referring to FIG. 9, in the image 200B of the correction data, the link portions 201, 203 in the image 200 of the input data shown in FIG. 7 are overwritten with the first correction images 201B, 203B at corresponding positions. In the case where the pixel values of the first correction images 201B, 203B indicate the highest density, the link information represented by the respective link portions 201, 203 in the image 200 of the input data is undistinguishable in the image 200B of the correction data.

Figure 10:
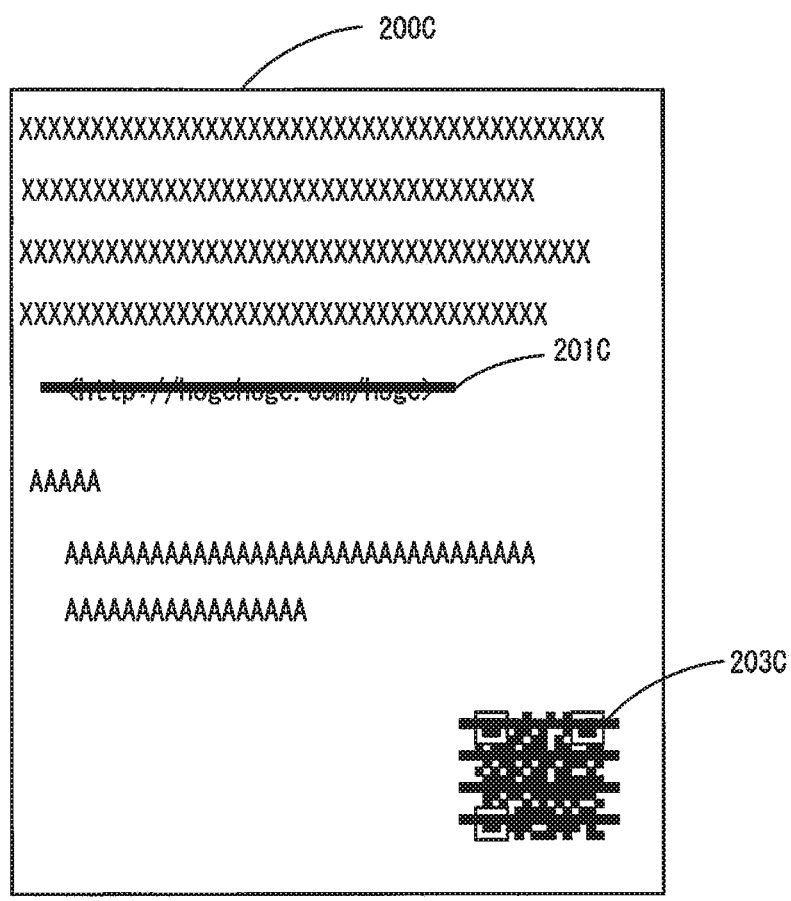
FIG. 10 is a third diagram showing one example of an image represented by correction data.

FIG. 10 is a third diagram showing one example of an image of the correction data. The image 200C of the correction data shown in FIG. 10 is produced when the link portion in the image 200 of the input data shown in FIG. 7 is overwritten with the second correction image. Referring to FIG. 10, in the image 200C of the correction data, the link portions 201, 203 in the image 200 of the input data shown in FIG. 7 are overwritten with the second correction images 201C, 203C at respectively corresponding positions. Here, the second correction images 201C, 203C are the images of strikethroughs Therefore, the image 200C of the correction data indicates that the link information respectively represented by the link portions 201, 203 in the image 200 of the input data has been deleted with use of the second correction images 201C, 203C.

Figure 11:
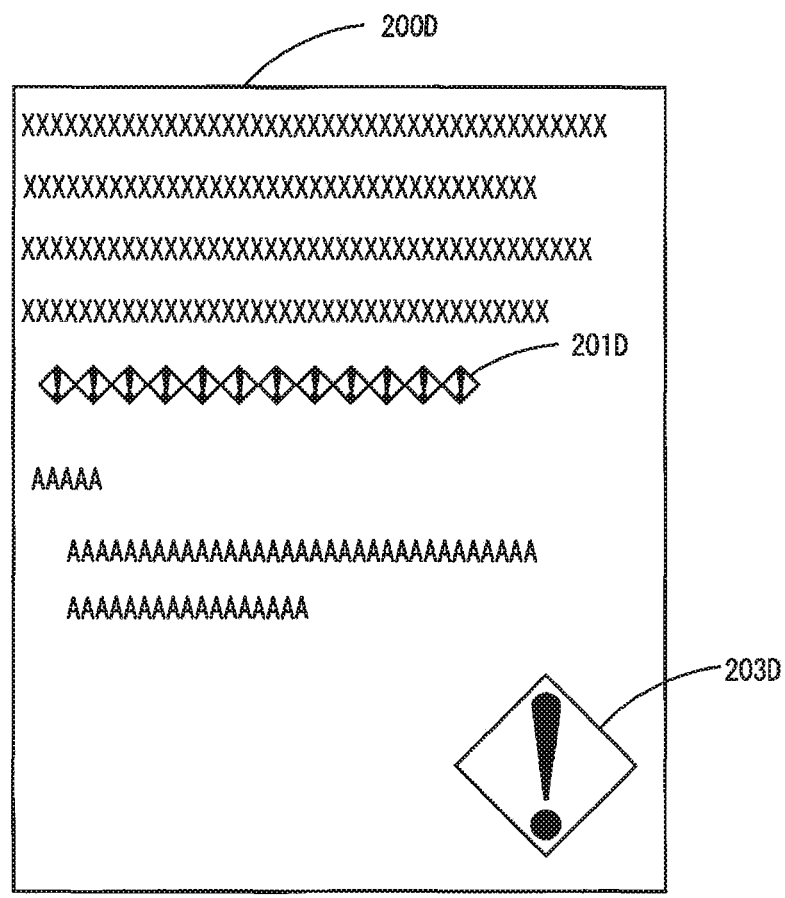
FIG. 11 is a fourth diagram showing one example of an image represented by correction data.

FIG. 11 is a fourth diagram showing one example of an image of the correction data. The image 200D of the correction data shown in FIG. 11 is produced when the link portion in the image 200 of the input data shown in FIG. 7 is deleted, and then overwritten with the third correction image. Referring to FIG. 11, in the image 200D of the correction data, the link portions 201, 203 in the image 200 of the input data shown in FIG. 7 are deleted and overwritten with the third correction images 201D, 203D at respectively corresponding positions. Here, the third correction images 201D, 203D are icons. Therefore, in the image 200D of the correction data, the third correction images 201D, 203D indicate that the link information pieces respectively represented by the link portions 201, 203 in the image 200 of the input data have been deleted.

Figure 12:
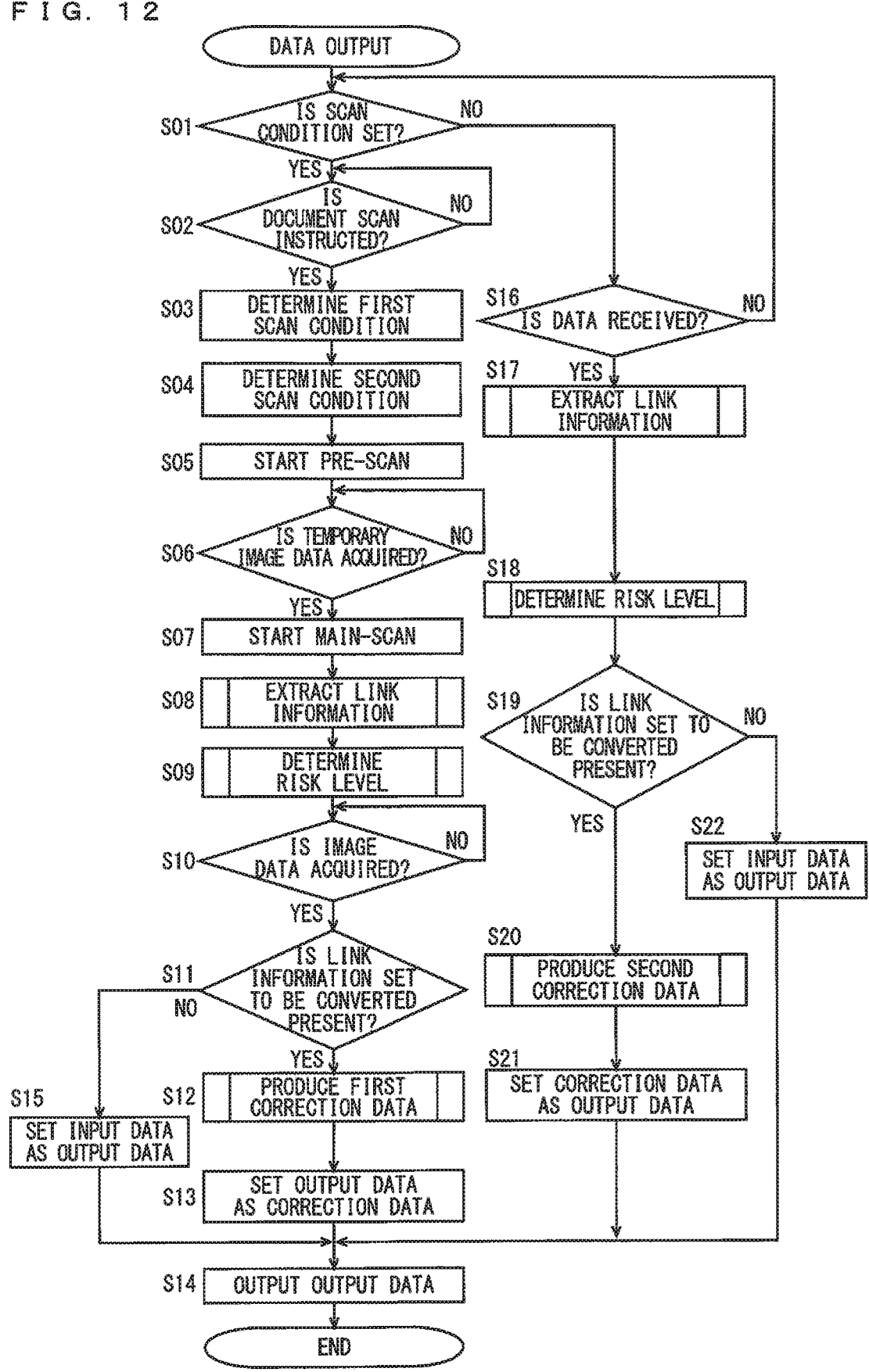
FIG. 12 is a flow chart showing one example of a flow of a data output process.

FIG. 12 is a flow chart showing one example of a flow of a data output process. The data output process is executed by the CPU 111 when the CPU 111 included in the MFP 100 executes a data output program. Referring to FIG. 12, the CPU 111 determines whether a scan condition has been set (step S01). If the CPU 111 accepts an operation of setting a scan condition, the process proceeds to the step S02. If not, the process proceeds to the step S15. In the step S02, the CPU 111 determines whether a document scan instruction has been accepted. The process waits until the CPU 111 accepts the document scan instruction (step S02). If the CPU 111 accepts the document scan instruction, the process proceeds to the step S03.

In the step S03, the CPU 111 determines the scan condition set in the step S01 as a first scan condition, and the process proceeds to the step S04. In the step S03, the CPU 111 determines a second scan condition, and the process proceeds to the step S05. The image quality defined by the second scan condition is lower than the image quality defined by the first scan condition. Here, the resolution defined by the second scan condition is lower than the resolution defined by the first scan condition. Further, the number of colors defined by the second scan condition is smaller than the number of colors defined by the first scan condition. Specifically, in the case where the number of colors defined by the first scan condition is two or more and indicates a color image, the CPU 111 makes the number of colors defined by the second scan condition be one, which indicates a monochrome image.

In the step S05, the CPU 111 starts the pre-scan. The CPU 111 controls the document scanning unit 130, and allows the document scanning unit 130 to start scanning a document according to the second scan condition determined in the step S04. Then, the process waits until temporary image data is acquired (NO in the step S06). When the temporary image data is acquired (YES in the step S06), the process proceeds to the step S07. The temporary image data is output by the document scanning unit 130 that has scanned the document according to the second scan condition. In the step S05, the process waits until the document scanning unit 130 outputs document data after the pre-scan. When the document scanning unit 130 outputs the document data, the process proceeds to the step S07.

In the step S07, the CPU 111 starts the main-scan. The CPU 111 controls the document scanning unit 130 and allows the document scanning unit 130 to start scanning a document according to the first scan condition determined in the step S03. In the step S08, the CPU 111 executes a link information extraction process, and the process proceeds to the step S09. The link information extraction process, which will be described below in detail, is the process of extracting the link information from the temporary image data acquired in the step S06. In the step S09, the CPU 111 executes a risk level determination process, and the process proceeds to the step S10. The risk level determination process, which will be described below in detail, is the process of determining whether the link information is risky and setting the link information that has been determined as risky as the link information to be converted.

In the step S10, the process waits until the input data is acquired (NO in the step S10). When the input data is acquired (YES in the step S10), the process proceeds to the step S11. The input data is the document data that is output by the document scanning unit 130 that has scanned the document according to the first scan condition. In the step S07, when the document scanning unit 130 outputs the document data after the main-scan, the CPU 111 acquires the document data as the input data, and the process proceeds to the step S11.

In the step S11, the CPU 111 determines whether the link information that has been set to be converted is present. In the risk level determination process in the step S09, the CPU 111 determines whether the link information that has been set to be converted is present. If the link information that has been set to be converted is present, the process proceeds to the step S12. If not, the process proceeds to the step S14. In the step S14, the CPU 111 sets the input data acquired in the step S10 as the output data, and the process proceeds to the step S14.

In the step S12, the CPU 111 executes a first correction data production process, and the process proceeds to the step S13. The first correction data production process, which will be described below in detail, is the process of producing the correction data by processing a portion in the input data representing the link information set to be converted. In the step S13, the CPU 111 sets the correction data produced in the step S12 as the output data, and the process proceeds to the step S14. In the step S14, the CPU 111 outputs the output data and ends the process. In the case where the process proceeds from the step S13, the output data is the correction data. In the case where the process proceeds from the step S15, the output data is the input data. The method of outputting the output data and the destination to which the output data is output are defined by a user's input operation. For example, in the case where the user's input operation defines the image formation as the output method, and defines a paper as the output destination, the CPU 111 controls the image forming unit 140 and allows the image forming unit 140 to form an image of the output data on the paper. In the case where the user's input operation defines storage as the output method and defines the HDD 115 as the output destination, the CPU 111 controls the HDD 115 and stores the output data in the HDD 115. In the case where a user's input operation defines emailing as an output method and defines an email address as the output destination, the CPU 111 controls the communication I/F unit 112 and transmits the output data by email.

In the meantime, in the step S16, the CPU 111 determines whether the communication I/F unit 112 has received data that is input externally. If the communication I/F unit 112 has received the data, the CPU 111 sets the received data as the input data, and the process proceeds to the step S17. If the CPU 111 has not received the data, the process returns to the step S01. In the step S17, the CPU 111 executes the link information extraction process, and the process proceeds to the step S17. While executing the link information extraction process on the temporary image data in the step S08, the CPU 111 executes the link information extraction process on the input data in the step S17. In the step S18, similarly to the step S09, the CPU 111 executes the risk level determination process, and the process proceeds to the step S19.

In the step S19, the CPU 111 determines whether the link information that is set to be converted is present. If the link information that is set to be converted is present, the process proceeds to the step S20. If not, the process proceeds to the step S22. In the step S22, the CPU 111 sets the data, received in the step S16 as the input data, as the output data, and the process proceeds to the step S14.

In the step S20, the CPU 111 executes a second correction data production process, and the process proceeds to the step S21. The second correction data production process, which will be described below in detail, is the process of producing the correction data by processing the portion representing the link information that is set to be converted and included in the data received in the step S16 as the input data. In the step S21, the CPU 111 sets the correction data as the output data, and the process proceeds to the step S14. In the step S14, the CPU 111 outputs the output data, and the process ends. In the case where the process proceeds from the step S21, the output data is the correction data. In the case where the process proceeds from the step S22, the output data is the input data.

Figure 13:
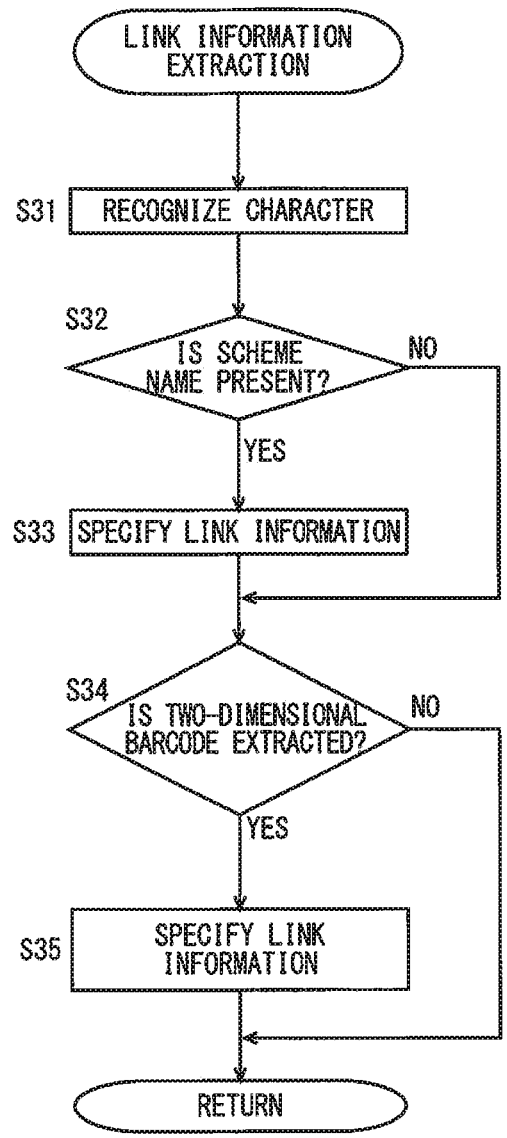
FIG. 13 is a flow chart showing one example of a flow of a link information extraction process.

FIG. 13 is a flow chart showing one example of a flow of the link information extraction process. The link information extraction process is a process executed in the step S08 and the step S17 of FIG. 11. In the link information extraction process executed in the step S08, the temporary image data is processed. In contrast, the link information extraction process executed in the step S17 is different from the link information extraction process executed in the step S08 in that the input data is processed. Here, the link information extraction process in which the temporary image data is processed is described unless otherwise stated.

Referring to FIG. 13, the CPU 111 recognizes the characters included in the image represented by the temporary image data (step S31), and the process proceeds to the step S32. In the step S32, the CPU 111 determines whether a predetermined scheme name is present in the character information that is acquired when the character recognition of the image represented by the temporary image data is carried out. If the predetermined scheme name is present, the process proceeds to the step S33. If not, the process proceeds to the step S34. In the step S33, the CPU 111 specifies the link information, and the process proceeds to the step S34. The character string is included in the character information, which is acquired when the character recognition of the image represented by the temporary image data is carried out. The character string that starts with a scheme name and includes a host name and a file name is specified as the link information. In the case where the link information extraction process is executed on the input data, the input data may not represent an image. In this case, the CPU 111 does not recognize characters, and the process proceeds to the step S32. In the step S33, the CPU 111 specifies the character string that is included in the input data, starts with a scheme name and includes a host name and a file name as the link information.

In the step S33, the CPU 111 extracts a two-dimensional barcode from the temporary image data. If the two-dimensional barcode is extracted, the process proceeds to the step S35. If not, the process returns to a data output process. In the case where detecting a position detection pattern defined by a two-dimensional barcode from the temporary image data, the CPU 111 extracts the two-dimensional barcode. The CPU 111 extracts the portion defined by the position detection pattern in the temporary image data as the two-dimensional barcode. In the next step S35, the CPU 111 specifies the link information, and the process returns to the data output process. In the case where the CPU 111 analyzes the two-dimensional barcode extracted in the step S34, converts the two-dimensional barcode into character information, and the character information is a group of the character information starting with a character string defined as a scheme name of a URL, the CPU 111 determines the character information as the link information.

Figure 14:
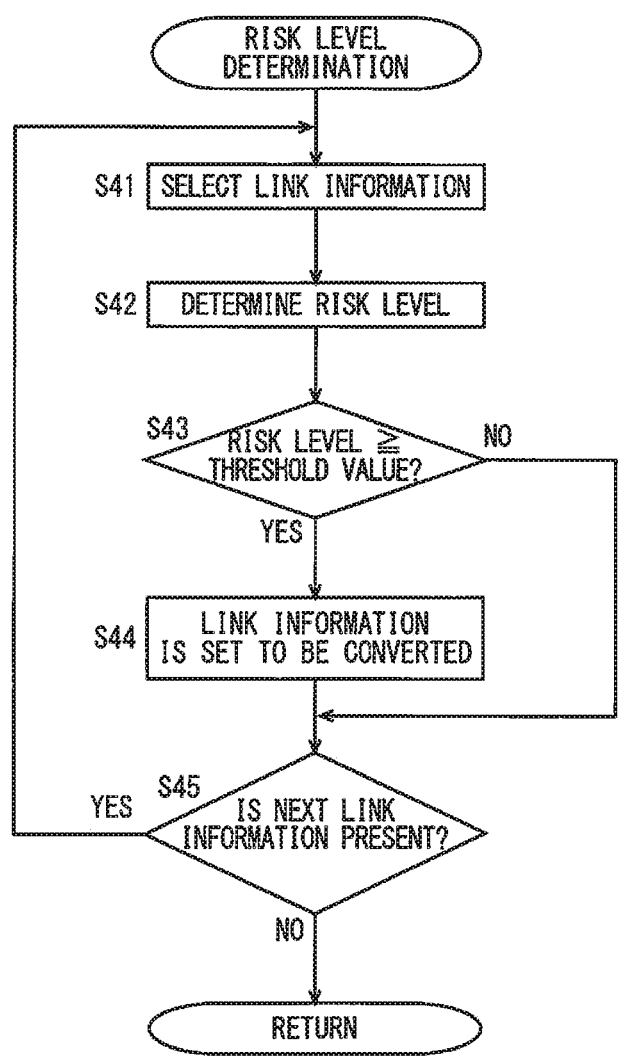
FIG. 14 is a flow chart showing one example of a flow of a risk level determination process.

FIG. 14 is a flow chart showing one example of a flow of the risk level determination process. The risk level determination process is the process executed in the step S09 and the step S18 of FIG. 11. The link information is determined before the risk level determination process is executed. Referring to FIG. 14, the CPU 111 selects the link information to be processed (step S41), and the process proceeds to the step S42. In the step S42, the risk level of the link information is determined, and the process proceeds to the step S43. In the case where the URL that is the same as the link information is included in the URL list that has been downloaded from the server 300, the CPU 111 determines the risk level associated with the URL by the URL list as the risk level of the link information.

In the step S43, if the risk level is equal to or higher than a predetermined threshold value, the process proceeds to the step S44. If not, the process proceeds to the step S45. In the step S44, the link information is set to be converted, and the process proceeds to the step S45. In the step S45, the CPU 111 determines whether the link information that is not selected in the step S41 to be converted is present. If unselected link information is present, the process returns to the step S41. If not, the process returns to the data output process.

Figure 15:
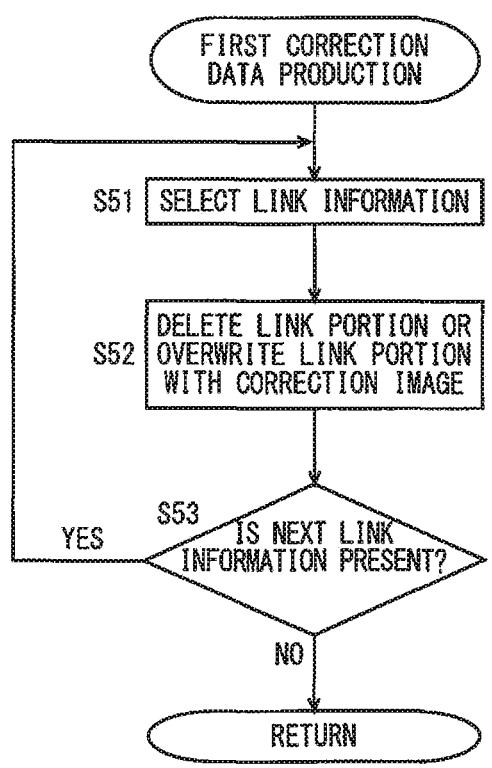
FIG. 15 is a flow chart showing one example of a flow of a first correction data production process.

FIG. 15 is a flow chart showing one example of a flow of the first correction data production process. The first correction data production process is a process executed in the step S12 of FIG. 11. Before the first correction data production process is executed, the input data is acquired, and the link information to be converted is determined. Referring to FIG. 15, the CPU 111 selects the link information to be processed from among the link information to be converted (step S51), and the process proceeds to the step S52.

In the step S52, the link portion representing the link information is deleted or overwritten with a correction image in the input data, and the process proceeds to the step S53. The data that is obtained by deletion of the link portion from the input data or the data that is obtained by overwriting of the link portion in the input data with a correction image is the correction data. The correction image includes a first correction image having the same shape and size as those of the link portion, a second correction image including strikethroughs and a third correction image including an icon, which is a predetermined image. The link portion may be overwritten with any of the first correction image, the second correction image and the third correction image. Alternatively, after the link portion is deleted, the link portion may be overwritten with any of the first correction image, the second correction image and the third correction image. Further alternatively, the link portion may be overwritten with a set of any of the first correction image, the second correction image and the third correction image.

In the step S53, the CPU 111 determines whether the link information that is not selected in the step S51 to be processed is present. If the link information that is not selected to be processed is present in the link information set to be converted, the process returns to the step S51. If not, the process returns to the data output process.

Figure 16:
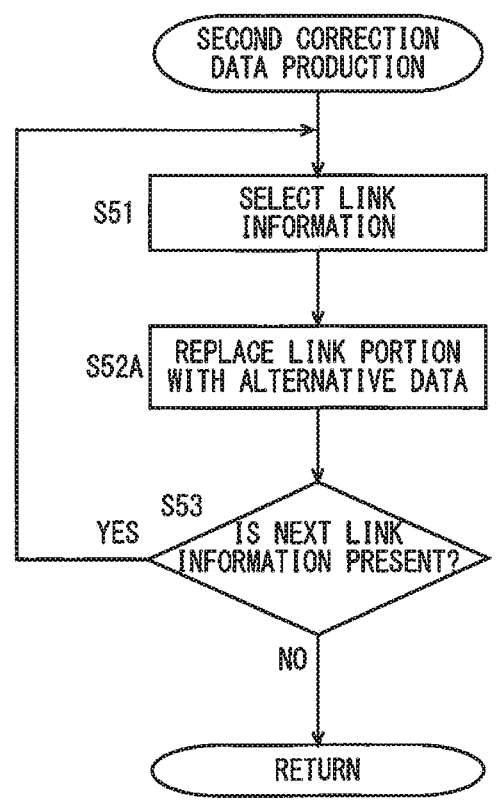
FIG. 16 is a flow chart showing one example of a flow of a second correction data production process.

FIG. 16 is a flow chart showing one example of a flow of the second correction data production process. The second correction data production process is the process executed in the step S20 of FIG. 11. Before the second correction data production process is executed, the input data is acquired, and the link information to be converted is determined. Referring to FIG. 16, the link information to be processed is selected from the link information to be converted (step S51), and the process proceeds to the step S52A.

In the step S52A, the link information in the input data is replaced with alternative data, and the process proceeds to the step S53. The data that is obtained by replacement of the link information in the input data with the alternative data is the correction data. The alternative data is the data representing whitespace characters. Further, the alternative data may be the data that is obtained by addition of a strikethrough to the link information, or may be predetermined character information.

In the step S53, the CPU 111 determines whether the link information that is not selected in the step S51 to be processed is present. If the link information that is not selected to be processed is present in the link information set to be converted, the process returns to the step S51. If not, the process returns to the data output process.

As described above, the MFP 100 in the present embodiment functions as a data processing device, acquires the data that has been input externally as input data, detects the link information included in the input data, determines the risk level of other data represented by the link information in the case where the link information is detected, produces the correction data by processing the portion representing the link information in the input data in the case where the risk level of the other data is determined to be equal or higher than a predetermined risk level and outputs the correction data externally instead of the input data. Therefore, the link information that has the risk level equal to or higher than the predetermined risk level and is included in the input data can be prevented from being used after the correction data is output externally.

Further, the MFP 100 produces the correction data by replacing the link information included in the input data with the alternative data. Therefore, the link information can be prevented from being output.

Further, the MFP 100 produces the correction data by deleting the link portion or overwriting the link portion with the correction image, the link portion representing the link information in the image represented by the input data.

Therefore, because the correction data that is obtained by deletion of the link portion or the correction data that is obtained by overwriting of the link portion with the correction image is output externally, the link information can be prevented from being output externally.

Further, the MFP 100 includes a character recognition means for recognizing characters shown in an image, so that the link information represented by the image can be detected.

Further, the MFP 100 extracts a barcode included in the image, so that the link information represented by the barcode can be detected.

Further, the MFP 100 overwrites the link portion in the image represented by the input data with the correction image, so that the link information can be prevented from being output.

Further, in the case where a user's input operation of instructing the scan according to the first scan condition is accepted, the MFP 100 acquires the data by scanning a document according to the second scan condition having image quality lower than that of the first scan condition as temporary image data, detects the link information from the temporary image data and produces the correction data using the input data that is obtained by scan of the document according to the first scan condition. Therefore, because the link information is detected from the temporary image data, a load of the process of detecting the link information can be reduced.

Further, immediately after the pre-scan according to the first scan condition and acquisition of the temporary image data, the MFP 100 performs the main-scan and acquires the input data. Therefore, the MFP 100 can detect the link information during the main-scan. Therefore, the time length from the scan of a document until the output of correction data can be as short as possible.

Although embodiments of the present invention have been described and illustrated in detail, the disclosed embodiments are made for purpose of illustration and example only and not limitation. The scope of the present invention should be interpreted by terms of the appended claims

What is claimed is:

1. A data processing apparatus comprising a hardware processor,
   the hardware processor:
   acquiring data that is input externally as input data;
   detecting link information that is included in the input data and represents a position of another data on a network;
   in the case where the link information is detected, determining a risk level of the other data represented by the link information;
   in the case where the risk level of the other data is determined to be equal to or higher than a predetermined risk level, modifying a portion representing the link information in the input data so as to render the link information unusable; and
   outputting the correction data externally instead of the input data.

2. The data processing apparatus according to claim 1, wherein
   the hardware processor modifies the portion by replacing the link information included in the input data with alternative data.

3. The data processing apparatus according to claim 1, wherein
   the hardware processor, in the case where the input data is data representing an image, modifies the portion by deleting a link portion or overwriting the link portion with a correction image, the link portion representing the link information in the image represented by the input data.

4. The data processing apparatus according to claim 3, wherein
   the hardware processor recognizes a character represented by the image.

5. The data processing apparatus according to claim 3, wherein
   the hardware processor extracts a barcode included in the image.

6. The data processing apparatus according to claim 3, wherein
   the correction image is at least one of an image having a same shape and a same size as those of the link portion, an image of a strikethrough and an image of an icon which is a predetermined image, and
   the hardware processor overwrites the link portion in the image represented by the input data with the correction image.

7. The data processing apparatus according to claim 3, further comprising:
   an operation accepter that accepts an operation input by a user; and
   a document scanner that optically scans a document according to a scan condition and outputs document data representing an image of the document, wherein
   the hardware processor,
   in the case where an operation of instructing a scan according to a first scan condition is accepted, acquires document data, that is output by the document scanner that has scanned the document according to a second scan condition having image quality lower than that of the first scan condition, as temporary image data,
   detects the link information from the temporary image data, and
   acquires document data, that is output by the document scanner that has scanned the document according to the first scan condition, as the input data.

8. The data processing apparatus according to claim 7, wherein
   the hardware processor, in response to accepting an operation of instructing a scan according to the first scan condition, allowing the document scanner to scan the document according to the second scan condition, and immediately after that, allowing the document scanner to scan the document according to the first scan condition.

9. A data output method performed by a data processing apparatus, including:
   an acquiring step of acquiring data that is input externally as input data;
   a link information detecting step of detecting link information included in the input data, the link information indicating a position of another data on a network;
   a risk level determining step of, in the case where the link information is detected, determining a risk level of the other data represented by the link information;
   a data producing step of, in the case where the risk level of the other data is determined to be equal to or higher than a predetermined risk level, modifying a portion representing the link information in the input data so as to render the link information unusable; and an output step of outputting the correction data externally instead of the input data.

10. The data output method according to claim 9, wherein the data producing step includes modifies the portion by replacing the link information included in the input data with alternative data.

11. The data output method according to claim 9, wherein the input data is data representing an image, and
the data producing step includes modifying the portion by deleting a link portion or overwriting the link portion with a correction image, the link portion representing the link information in an image represented by the input data.

12. The data output method according to claim 11, wherein
the link information detecting step includes recognizing a character represented by the image.

13. The data output method according to claim 11, wherein
the link information detecting step includes extracting a barcode included in the image.

14. The data processing apparatus according to claim 11, wherein
the correction image is at least one of an image having a same shape and a same size as those of the link portion, an image of a strikethrough and an image of an icon which is a predetermined image, and
the data producing step includes overwriting the link portion in the image represented by the input data with the correction image.

15. The data output method according to claim 11, wherein
the data processing apparatus includes
an operation accepter that accepts an operation input by a user, and
a document scanner that optically scans a document according to a scan condition and outputs document data representing an image of the document,
the data output method further includes a temporary acquiring step of, in the case where an operation of instructing a scan according to a first instruction is accepted, acquiring document data, that is output by the document scanner that has scanned the document according to a second scan condition having image quality lower than that of the first scan condition, as temporary image data,
the link information detecting step includes detecting the link information from the temporary image data, and
the acquiring step includes acquiring document data, that is output by the document scanner that has scanned the document according to the first scan condition, as the input data.

16. The data output method according to claim 15, further including a scan control step of, in response to accepting an operation of instructing a scan according to the first scan condition, allowing the document scanner to scan the document according to the second scan condition, and immediately after that, allowing the document scanner to scan the document according to the first scan condition.

17. A non-transitory computer-readable recording medium encoded with a data output program executed by a computer controlling a data processing apparatus,
the data output program allowing the computer to execute:
an acquiring step of acquiring data that is input externally as input data;
a link information detecting step of detecting link information included in the input data, the link information indicating a position of another data on a network;
a risk level determining step of, in the case where the link information is detected, determining a risk level of the other data represented by the link information;
a data producing step of, in the case where the risk level of the other data is determined to be equal to or higher than a predetermined risk level, modifying a portion representing the link information in the input data so as to render the link information unusable; and
an output step of outputting the correction data externally instead of the input data.

18. The non-transitory computer-readable recording medium encoded with the data output program according to claim 17, wherein
the data producing step includes modifying the portion by replacing the link information included in the input data with alternative data.

19. The non-transitory computer-readable recording medium encoded with the data output program according to claim 17, wherein
the input data is data representing an image, and
the data producing step includes modifying the portion by deleting a link portion or overwriting the link portion with a correction image, the link portion representing the link information in an image represented by the input data.

* * * * *